US010618545B2

United States Patent
Asao et al.

(10) Patent No.: US 10,618,545 B2
(45) Date of Patent: Apr. 14, 2020

(54) ELECTRIC POWER STEERING APPARATUS

(71) Applicant: Mitsubishi Electric Corporation, Tokyo (JP)

(72) Inventors: Yoshihito Asao, Tokyo (JP); Akihiko Mori, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 697 days.

(21) Appl. No.: 15/124,229

(22) PCT Filed: May 8, 2014

(86) PCT No.: PCT/JP2014/062343
§ 371 (c)(1),
(2) Date: Sep. 7, 2016

(87) PCT Pub. No.: WO2015/170383
PCT Pub. Date: Nov. 12, 2015

(65) Prior Publication Data
US 2017/0015347 A1 Jan. 19, 2017

(51) Int. Cl.
*B62D 5/04* (2006.01)
*H02K 11/33* (2016.01)
*H02K 11/02* (2016.01)

(52) U.S. Cl.
CPC ........... *B62D 5/046* (2013.01); *B62D 5/0406* (2013.01); *H02K 11/02* (2013.01); *H02K 11/33* (2016.01)

(58) Field of Classification Search
CPC ...... B62D 5/046; B62D 5/0406; H02K 11/33; H02K 11/02
See application file for complete search history.

(56) References Cited

U.S. PATENT DOCUMENTS 9,045,156 B2 * 6/2015 Omae ................. B62D 5/0406
2012/0313467 A1 12/2012 Omae et al.
(Continued)

FOREIGN PATENT DOCUMENTS

JP 2004-032930 A 1/2004
JP 2004-254359 A 9/2004
(Continued)

OTHER PUBLICATIONS

International Search Report of PCT/JP2014/062343 dated Jul. 22, 2014 [PCT/ISA/210].

*Primary Examiner* — Joseph M Rocca
*Assistant Examiner* — Michael R Stabley
(74) *Attorney, Agent, or Firm* — Sughrue Mion, PLLC; Richard C. Turner

(57) ABSTRACT

In an electric power steering apparatus, a control unit includes: a power module that is in surface contact with a heatsink, and in which a plurality of switching elements are mounted internally; a holder that places the power module in close contact with the heat sink, and that also positions the power module; and a controlling circuit board that is disposed so as to be separated axially from the holder, and on which a central processing unit (CPU) is mounted; and the power module is disposed on a first surface of a first side of the holder, and a circumferential surface of a capacitor that suppresses electric power supply pulsation is disposed so as to be in close contact with a capacitor recess portion that is formed on a second surface of a second side of the holder.

26 Claims, 6 Drawing Sheets

(56) References Cited

U.S. PATENT DOCUMENTS

| | | | | |
|---|---|---|---|---|
| 2013/0099611 A1* | 4/2013 | Suga | ............... | H02K 5/225 |
| | | | | 310/71 |
| 2014/0035445 A1* | 2/2014 | Uryu | ............... | H02K 11/33 |
| | | | | 310/68 D |
| 2014/0326530 A1* | 11/2014 | Asao | ............... | B62D 5/0406 |
| | | | | 180/443 |

FOREIGN PATENT DOCUMENTS

| | | |
|---|---|---|
| JP | 2009-078690 A | 4/2009 |
| JP | 2011-239574 A | 11/2011 |
| JP | 2013-151205 A | 8/2013 |
| JP | 2014-008796 A | 1/2014 |
| JP | 2014-075866 A | 4/2014 |
| WO | 2013/132584 A1 | 9/2013 |

\* cited by examiner

ELECTRIC POWER STEERING APPARATUS

CROSS REFERENCE TO RELATED APPLICATIONS

This application is a National Stage of International Application No. PCT/JP2014/062343, filed May 8, 2014, the contents of which are incorporated herein by reference in its entirety.

TECHNICAL FIELD

The present invention relates to an electric power steering apparatus that assists a steering force on a steering wheel using an electric motor, and particularly relates to an electric power steering apparatus in which an electric motor and a controlling unit are integrated.

BACKGROUND ART

Conventionally, in order to reduce electric power steering apparatuses in size, motor control units (MCUs) have been proposed that integrate a control unit and an electric motor.

In some of these MCUs, the control unit is disposed so as to be coaxial to an output shaft of the electric motor, but it is necessary to plan the construction carefully, and the techniques shown in Patent Literature 1 and 2 have been proposed, for example.

In the control unit of the above MCUs, a controlling circuit board onto which a central processing unit (CPU) is mounted, power modules (PMs) that constitute an inverter circuit for supplying electric power to a winding of the electric motor, heatsinks, a connector assembly, etc., are disposed, and ways must be found to connect them electrically and structurally.

In Patent Literature 1, in particular, PMs that supply electric power to each of three phases are arranged distributively, capacitors, which are large parts for suppressing electric power supply pulsation, are disposed in spaces therebetween, and in electrical wiring for the PMs and the capacitors, terminals that extend upward together are connected to busbars.

In Patent Literature 2, pairs of PMs are lined up in parallel for two three-phase inverters, and an attempt is made to reduce size compared to Patent Literature 1 by mounting the capacitors transversely.

CITATION LIST

Patent Literature

Patent Literature 1: Japanese Patent Laid-Open No. 2011-239574 (Gazette)
Patent Literature 2: Japanese Patent Laid-Open No. 2013-151205 (Gazette)

SUMMARY OF THE INVENTION

Problem to be Solved by the Invention

In the control unit portion of Patent Literature 1 above, because the capacitors in particular, which are large parts, are disposed vertically parallel to the output shaft of the electric motor, one problem has been that the entire control unit must be constructed so as to be extended in the direction of the output shaft by an amount proportionate to capacitor height.

Another problem has been that portions of the heatsink are cut through to form recess portions in order to house the capacitors, reducing heat radiating area of the heatsink.

In the MCU of Patent Literature 2, the construction has those capacitors installed transversely, but there is still room for reductions in size to accommodate one set of three phases.

The present invention aims to solve the above problems and provides an electric power steering apparatus in which axial dimensions are reduced by consolidating power modules and disposing capacitors in space created thereby.

Means for Solving the Problem

An electric power steering apparatus according to the present invention is an electric power steering apparatus in which a control unit that controls driving of an electric motor is disposed so as to be coaxial to an output shaft of the electric motor, and in which the control unit and the electric motor are integrated, wherein: the control unit includes: a power module that is in surface contact with a heatsink, and in which a plurality of switching elements are mounted internally that control electric power that is supplied to the electric motor; a holder that places the power module in close contact with the heat sink, and that also positions the power module; and a controlling circuit board that is disposed so as to be separated from the holder, and on which a central processing unit (CPU) that controls driving of the electric motor is mounted, and the power module is disposed on a first surface of a first side of the holder, and a circumferential surface of a capacitor that suppresses electric power supply pulsation is disposed so as to be in close contact with a capacitor recess portion that is formed on a second surface of a second side of the holder.

An electric power steering apparatus according to the present invention is an electric power steering apparatus in which a control unit that controls driving of an electric motor is disposed so as to be coaxial to an output shaft of the electric motor, and in which the control unit and the electric motor are integrated, wherein: the control unit includes: a power module that is in surface contact with a heatsink, and in which a plurality of switching elements are mounted internally that control electric power that is supplied to the electric motor; a holder that places the power module in close contact with the heat sink, and that also positions the power module; and a controlling circuit board that is disposed so as to be separated from the holder, and on which a central processing unit (CPU) that controls driving of the electric motor is mounted, and the power module is disposed on a first surface of a first side of the holder, and a circumferential surface of a capacitor that suppresses electric power supply pulsation is disposed so as to be in close contact with a capacitor recess portion that is formed on the first surface of a second side of the holder.

Effects of the Invention

According to the electric power steering apparatus according to the present invention, axial dimensions can be reduced, enabling reductions in size, by disposing a power module on a first side of a holder, and disposing a circumferential surface of a capacitor in close contact with a capacitor recess portion on a second side.

DESCRIPTION OF EMBODIMENTS

Respective embodiments of the present invention will now be explained based on the drawings, and in each of the figures, identical or corresponding members and portions will be explained using identical numbering.

Embodiment 1

Figure 1:
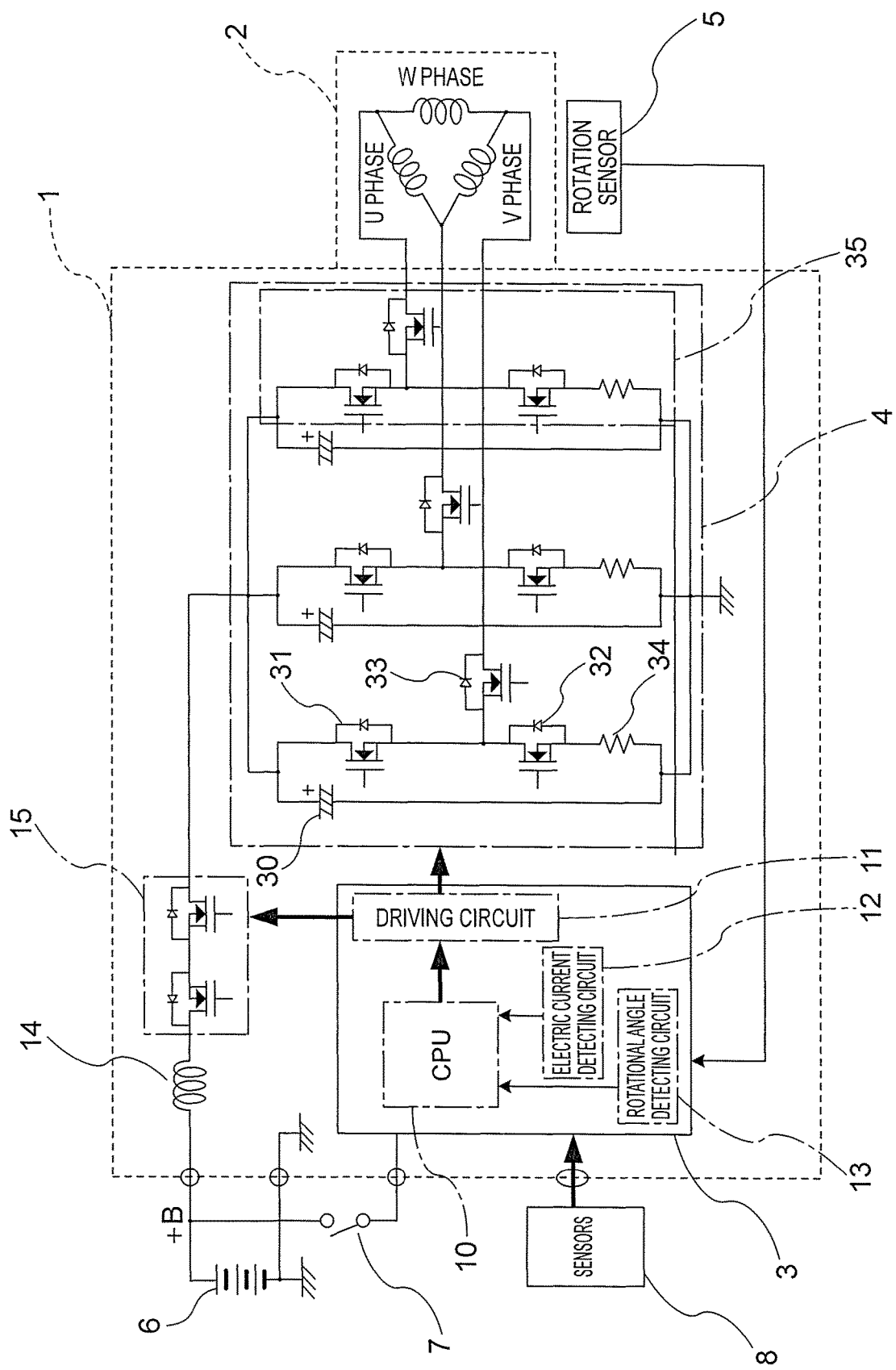
FIG. 1 is an overall circuit configuration diagram of an electric power steering apparatus according to Embodiment 1 of the present invention.

FIG. 1 is a circuit diagram that shows an electric power steering apparatus according to Embodiment 1 of the present invention.

This apparatus includes: a control unit 1; an electric motor 2 that assists a steering force of a steering wheel (not shown); a battery; an ignition switch 7; sensors 8 such as a torque sensor that detects the steering force of the steering wheel and a vehicle speed sensor, etc.; and a rotation sensor 5 that detects a rotational angle of the electric motor 2.

The control unit 1 and the electric motor 2 have an integrated construction, and the sensors 8 and the rotation sensor 5 are mounted to respective portions of a vehicle.

The control unit 1 includes as major components: a controlling circuit board 3 to which a central processing unit (CPU) 10 is mounted; and an "inverter circuit" 4 that supplies electric current to a motor winding of the electric motor 2.

The electric motor 2 is a brushless electric motor in this embodiment, and is shown as being constituted by a three-phase winding, but is not limited to a three-phase brushless type, and may be an electric motor with brushes, or a polyphase winding electric motor that has three or more phases.

The inverter circuits 4 have an identical circuit configuration 35 for each of the phases. These inverter circuits 4 include as major components: switching elements 31 and 32 that are connected in series; capacitors 30 for suppressing noise such as pulsation, etc.; switching elements 33 that have a relay function that can interrupt electric current supply; and shunt resistors 34 that enable current detection. Moreover, parts that are shown in the figures (the switching elements 31, 32 and 33, and the shunt resistors 34) can also be integrated and configured as a power module (PM).

Mounted to the controlling circuit board 3 around the CPU 10, which calculates and outputs a value of electric current that drives the electric motor 2 based on the information from the sensors 8, are: a driving circuit 11 for interfacing between the PM 35a and the CPU 10; an electric current detecting circuit 12 that amplifies voltage that is detected by the shunt resistors 34, and converts it to enable to it to be inputted into the CPU 10; and a rotational angle detecting circuit 13 that gathers information from the rotation sensor 5 that detects the rotational angle of the electric motor 2.

Also disposed on the control unit 1 besides the above are: a connector; an electric power supply line (positive electric power supply and ground) for supplying a large current to the motor winding, that is directly inputted from a battery 6; a noise suppressing coil 14 that is connected in series to this electric power supply line; and an electric power supply relay 15 that has an electric power supply relay function that can interrupt the electric power supply line.

Thus, there are a great number and variety of parts, including large parts and heat-generating parts, and reductions in size of the control unit 1 are required in order to dispose the electric motor 2 and the control unit 1 coaxially on the output shaft of the electric motor 2, and in order to configure the control unit 1 in particular using body dimensions that are approximately identical to the radial dimensions of the electric motor 2, various planning is also required not only for reductions in size and arrangement of each of the parts, but also for heat radiating characteristics, shielding from motor driving noise, etc.

Construction of a motor control unit (MCU) that integrates the control unit 1 and the electric motor 2 that are described above will be explained using FIGS. 2 and 3.

Figure 2:
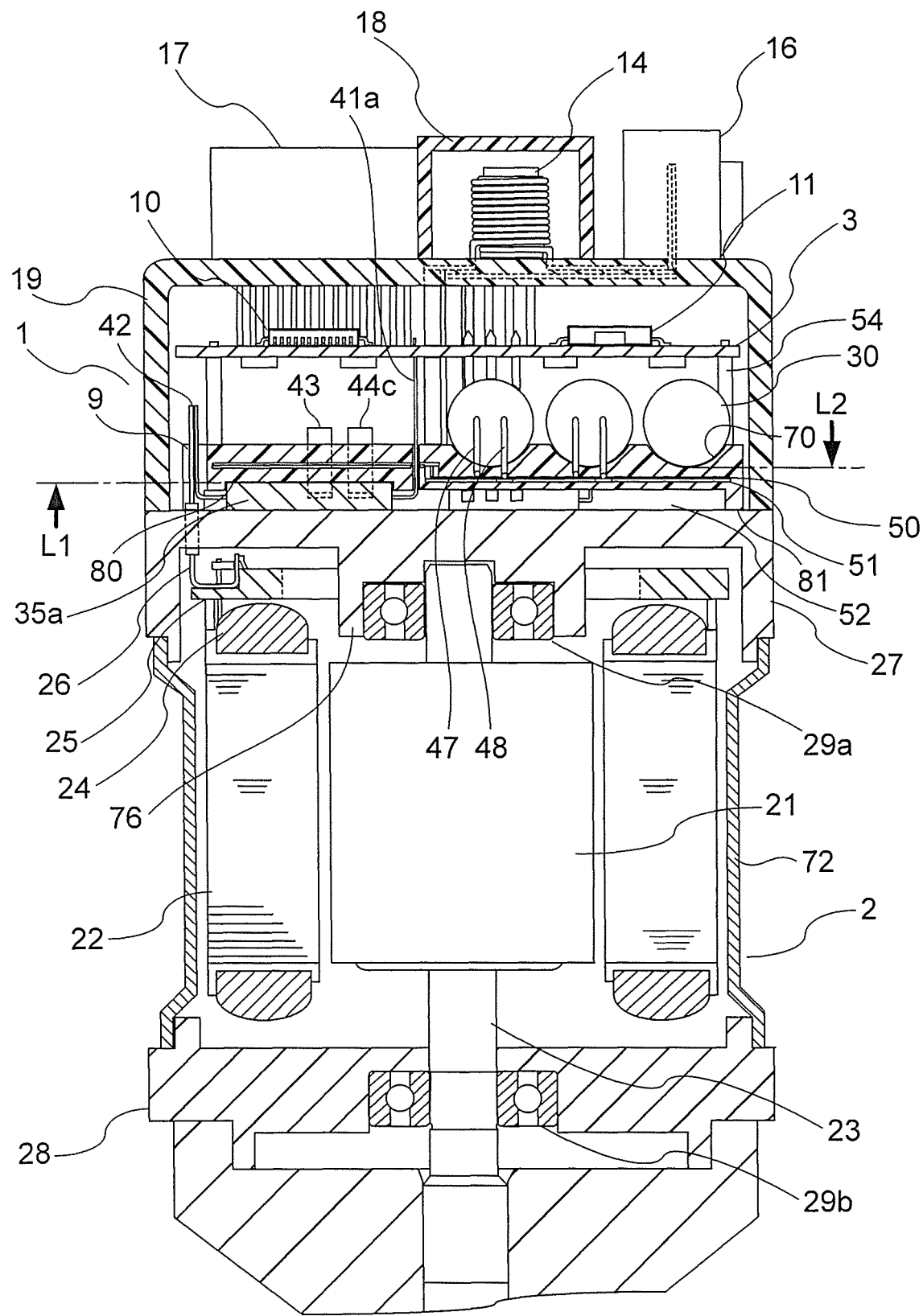
FIG. 2 is a cross section that shows an MCU of the electric power steering apparatus according to Embodiment 1 of the present invention.
Figure 3:
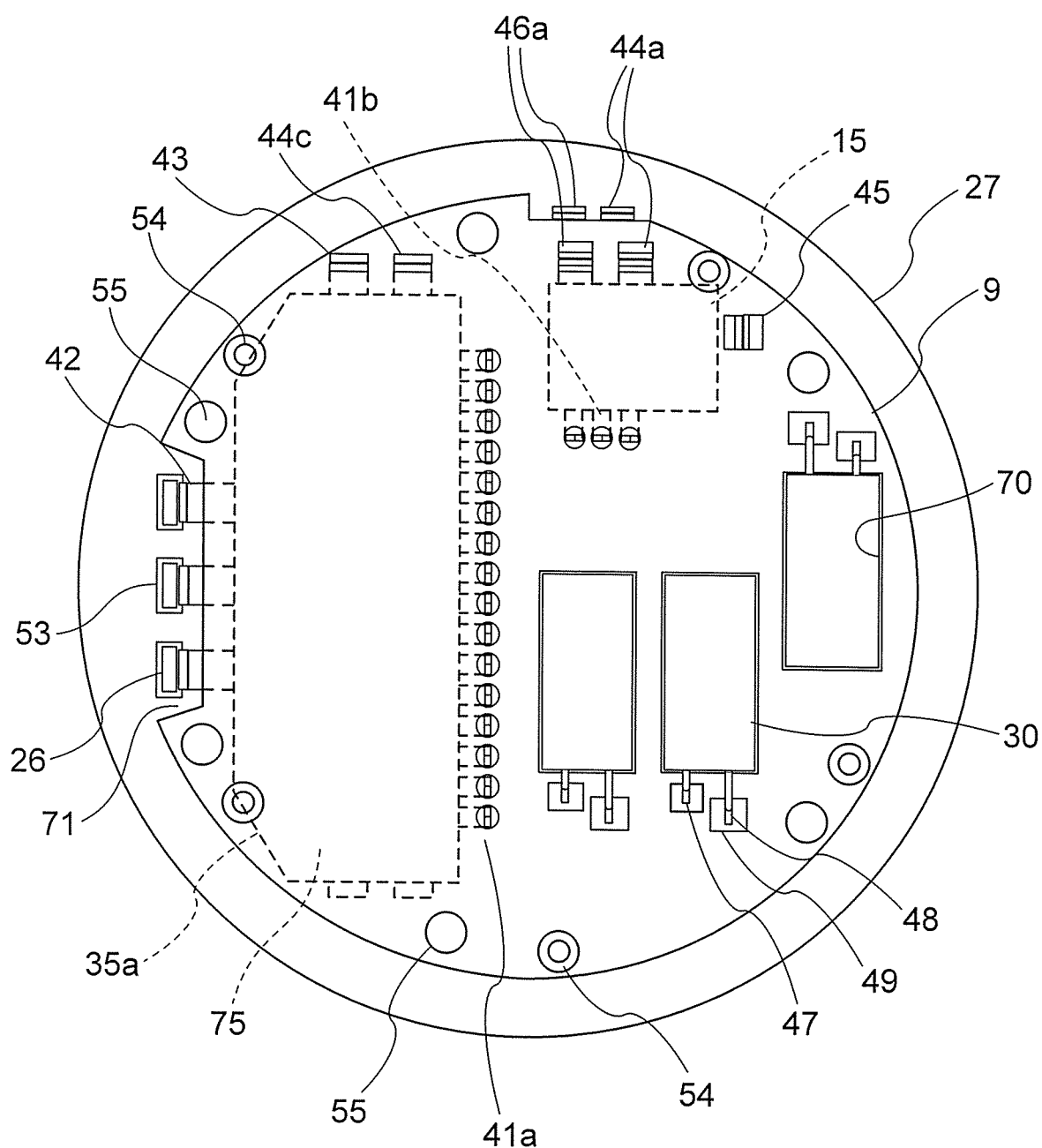
FIG. 3 is a plan of the MCU from FIG. 2 after a cover and a controlling circuit board are removed.

FIG. 2 is a cross section that shows overall configuration of the MCU, and FIG. 3 is a plan of the MCU from FIG. 2 after a case 19 and the controlling circuit board 3 are removed, a lower portion of FIG. 2 being an output end of the electric motor 2, and an upper portion of FIG. 2 being a non-output end of the electric motor 2, and the control unit 1 is disposed on the non-output end of the electric motor 2 so as to be coaxial to the output shaft 23.

The electric motor 2 includes: a rotor 21 through which the output shaft 23 passes, and to a surface of which permanent magnets (not shown) are mounted; a stator 22 that surrounds a circumference of the rotor 21, and that has motor windings 24 in which three phases are wound; an upper frame 27 and a lower frame 28 that constitute heatsinks that hold these structural parts from two axial ends; a bracket 72 that surrounds an outer circumferential surface of the stator 22, and that joins the upper frame 27 and the lower frame 28; a non-output end bearing 29a that is fitted into the upper frame 27, and that rotatably supports the output shaft 23; and an output end bearing 29b that is fitted into the lower frame 28, and that rotatably supports the output shaft 23. An expanded portion 76 is formed on a central portion of the upper frame 27, and the non-output end bearing 29a is fitted into this expanded portion 76.

In FIG. 2, the output end of the electric motor 2, which is below the lower frame 28, is connected to a reduction gear through which rotation of the output shaft 23 is transmitted.

The end portions of each of the phases of the motor windings 24 are on upper portions of the motor windings 24, and an electrically insulating connecting ring 25 for connecting each of the motor windings 24 into the Δ (delta) that is shown in FIG. 1 is disposed above the motor windings 24. Three extension windings 26 to which adjacent end portions of each of the phases of the motor windings 24 are connected extend outward and upward as final output end portions. Moreover, the Δ (delta) connection is an example, and may alternatively be a wye connection.

By supplying an electric current from the control unit 1 to these extension windings 26, magnetic fields are generated in the motor windings 24, and the rotor 21 rotates due to repulsion and attraction acting between the motor windings 24 and the permanent magnets of the rotor 21 as a result thereof.

In the control unit 1, the PM 35a is mounted to the upper frame 27 inside a resin case 19 that is mounted onto the upper frame 27 and that has a cylindrical cup shape. This PM 35a is covered by a holder 9. The controlling circuit board 3 is disposed above the holder 9 so as to be supported by a plurality of posts 54 that are disposed on a circumferential edge portion of the holder 9. The upper frame 27, which is circular, has an approximately identical diameter to that of the case 19.

In the PM 35a, the circuit configurations 35 that are shown in FIG. 1 for each of the phases are mounted together inside a molded body 75 that has a trapezoidal shape, as shown in FIG. 3.

This PM 35a is disposed on one surface of a first side of the holder 9, one surface on a second side being clear space.

In consideration of heat radiating characteristics, the PM 35a is placed in close contact with an upper surface of the upper frame 27, which constitutes a heatsink.

The heat radiating characteristics of the PM 35a are good because the upper frame 27 has an approximately identical diameter to that of the bracket 72 of the electric motor 2, it is also thick in the axial direction, making thermal capacity large, and in addition an outer circumferential surface thereof is exposed externally.

Moreover, the heat radiating characteristics of the PM 35a can be further improved if the upper frame 27 is formed using aluminum, and the circuit configurations 35 are exposed on a side of the PM 35a near the upper frame 27.

The upper frame 27 is a heatsink, has a function of holding the non-output end bearing 29a, and is also a shared component of the electric motor 2 and the control unit 1, and also has a function as a boundary wall between the electric motor 2 and the control unit 1.

The motor terminals 42 of each of the phases, the U phase, the V phase, and the W phase, extend upward at an edge portion of the molded body 75 of the PM 35a. These motor terminals 42 are comparatively wide so as to be able to connect to the extension windings 26 of the electric motor 2.

A large number of narrow-width signal terminals 41a extend vertically from an edge of the molded body 75 that faces the above-mentioned edge portion. These thin-wired signal terminals 41a are signal lines for commands from the controlling circuit board 3, and for monitoring.

In addition, an electric power supply terminal 43 (positive electric power supply) and an electric power supply terminal 44c (ground) extend upward at a short edge of the molded body 75, and these electric power supply terminals 43 and 44c are also wide.

The respective end portions of the extension windings 26, the motor terminals 42 that are connected to the extension windings 26, and the electric power supply terminal 43 and 44c extend out beyond the holder 9 to a space between the holder 9 and the controlling circuit board 3, and the large number of signal terminals 41a, on the other hand, extend further to reach the controlling circuit board 3.

The capacitors 30, which are large parts, are disposed such that respective circumferential surfaces thereof are in close contact with capacitor recess portions 70 that are formed on a side of the holder 9 near the controlling circuit board 3, one capacitor 30 being disposed for each of the phases. Respective tip end portions of positive capacitor terminals 47 and negative capacitor terminals 48 each extend toward an internal portion of the holder 9.

The holder 9 is made of an insulating resin, and at least a busbar 50 (of the positive electric power supply) and a busbar 51 (ground) are set up in an internal portion thereof. These two busbars 50 and 51 are disposed so as to be approximately parallel.

For simplicity, the busbar 50 and the busbar 51 are depicted in FIG. 2 as if stacked, but in reality the busbar 50 and the busbar 51 are approximately in a common plane.

A step is formed in the busbars 50 and 51 between a side near the PM 35a and a side near the capacitors 30, such that the side near the capacitors 30 is lower (nearer to the upper frame 27) than the side near the PM 35a.

Integrated circuits (ICs) such as the CPU 10, the driving circuit 11, etc., and other parts are mounted on two surfaces of the controlling circuit board 3. Information terminals from the sensors 8 extend above the controlling circuit board 3, and the signal terminals 41a from the PM 35a extend downward and pass through the controlling circuit board 3. This controlling circuit board 3 is held by the plurality of posts 54 that extend upward from the holder 9. The distances between the controlling circuit board 3 and the holder 9, and between the controlling circuit board 3 and the capacitors 30, are adjusted by changing the lengths of these posts 54.

Connectors are disposed on an upper portion of the case 19.

A connector 16 has two large-electric current terminals (a positive electric power supply and ground) from the battery 6, and a connector 17 has a large number of comparatively small capacity electric current terminals such as for the sensors; 8 and the ignition switch 7. A cover 18 is disposed on an upper portion of the case 19. The coil 14 from FIG. 1 is mounted inside this cover 18.

This coil 14 is inserted into the positive electric power supply line, as shown in the circuit diagram in FIG. 1, and is disposed in a vicinity of the electric power supply connector 16 in order to serve a function of suppressing noise emitted from the control unit 1.

This coil 14 is also a large part, and disposing it inside the control unit 1 is also spatially disadvantageous. Thus, the coil 14 is disposed in a vicinity of the electric power supply line between the large-current connector 16 and the small electric current connector 17, and output from this coil 14 is connected with the busbar line of the holder 9 by passing through the controlling circuit board 3 together with the ground line, or by bypassing an end portion of the controlling circuit board 3.

In above MCU, the electric motor 2 and the control unit 1 are integrated so as to have approximately identical diameters.

The holder 9 is pressed toward the upper frame 27 in order to place the PM 35a in close contact with the upper frame 27, and also has a module recess portion 80 for positioning the PM 35a.

Thickness of the PM 35a is several mm (approximately 5-8 mm), and there is only a narrow gap 52 between the holder 9 and the upper frame 27 that is formed by the holder 9 coming into contact with the upper frame 27 at a contacting portion 81, naturally making it impossible to dispose the capacitors 30 and other large parts in the space immediately next to the PM 35a.

Mounting the capacitors 30 directly to the upper frame 27, which is a heatsink, is also electrically and thermally impossible.

Because of that, the holder 9 is mounted to the upper frame 27 so as to have a gap 52 that is less than or equal to the thickness of the PM 35a immediately next to the PM 35a, and the capacitors 30 are disposed on an upper surface of the holder 9 on an opposite side from the gap 52.

A step is formed in the busbars 50 and 51 between a side near the PM 35a and a side near the capacitors 30, such that the side near the capacitors 30 is lower (nearer to the upper frame 27) than the side near the PM 35a.

Consequently, the distance between the busbars 50 and 51 and the upper surface of the holder 9 on a side near the controlling circuit board 3 can be enlarged in proportion to that lowering on the side near the capacitors 30, and as a result the depth of the capacitor recess portions 70 that are formed on the holder 9 can be increased.

In other words, the capacitors 30 can be positioned closer to the upper frame 27, and a clamping surface L1 of the PM 35*a* and the bottom portion surfaces L2 of the capacitors 30 in the capacitor recess portions 70 can be placed in close proximity to the clamping surface L1.

The functioning of this holder 9 covers multiple functions that include: holding of the busbars 50 and 51 of the electric power supply system; clamping of the PM 35*a*; positioning of each of the terminals 41*a*, 43, 44*c*, and 42 of the PM 35*a*; positioning of the PM 35*a*; holding of the capacitors 30; and holding of the controlling circuit board 3 via the posts 54.

Moreover, if the capacitors have a rectangular prism shape, for example, the recess portions will also have angular apertures that conform thereto. Furthermore, portions of the capacitors 30 are embedded in the capacitor recess portions 70, but the capacitors 30 may be further fixed to the holder by using an adhesive or resilient cushions, etc.

As shown in FIG. 3, the maximum circle of the MCU is the outer circumference of the upper frame 27, which also functions as a heatsink, and the holder 9 has a circular shape that is smaller than this upper frame 27.

The PM 35*a* and the electric power supply relay 15 at which signal terminals 41*b* and an electric power supply terminal 45 extend outward are disposed on a rear surface of the holder 9 on an opposite side from the capacitors 30, which are mounted to the front surface, and these parts are represented by broken lines in FIG. 3.

The signal terminals 41*a* of the PM 35*a* and the signal terminals 41*b* of the electric power supply relay 15 extend upward so as to pass through apertures in the holder 9.

Tip end portions of each of the terminals 42, 43, 44*c*, and 45 for large currents, on the other hand, protrude from the front surface of the holder 9.

The respective extension windings 26 pass from the electric motor 2 through the upper frame 27, extend outward through notch portions 71 of the holder 9, and are welded to the motor terminals 42. Angular electrically insulating tubes 53 are embedded in the upper frame 27, and the extension windings 26 pass through these electrically insulating tubes 53.

Consequently, the electrically insulating tubes 53 function to ensure electrical insulation between the extension windings 26 and the upper frame 27, and to position the extension windings 26 relative to the motor terminals 42.

The electric power supply system is connected first from the connector 16 and the coil 14 in FIG. 2 to the terminals of the electric power supply relay 15 by means of the electric power supply terminal end portion 44*a* (ground) and the electric power supply terminal end portion 46*a* (positive electric power supply) that are on a side near the busbars 50 and 51. The output from this electric power supply relay 15 (the positive electric power supply line) is extended into the holder 9 as the electric power supply terminal 45. The ground side, on the other hand, extends directly from the electric power supply terminal end portion 44*a* into the holder 9.

The electric power supply terminals 43 (positive electric power supply) and 44*c* (ground) of the PM 35*a* extend from a short side portion, and are respectively connected by welding to the busbars 50 and 51 in a similar manner.

Lengths of projection of the capacitor terminals 47 (positive) and 48 (ground) of the capacitors 30 are varied such that the positive side is shorter, and ground is longer. The positive line of the busbars 50 and 51 is also disposed higher than the ground line. Portions of the busbars 50 and 51 are exposed externally using window portions 49 that are formed on the holder 9, and the capacitor terminals 47 (positive) and 48 (ground) are connected at these window portions 49 by welding or soldering.

A plurality of round apertures 55 are formed around a circumference of a circumferential edge portion of the holder 9. The holder 9 is fixed to the upper frame 27 by fastening bolts (not shown) through these round apertures 55. Four round apertures 55 are formed around the PM 35*a* in particular due to the need to clamp the PM 35*a* onto the upper frame 27.

Moreover, the holder may be configured so as to be fixed to the upper frame without using the bolts by press-fitting post portions that are formed on the holder into apertures that are disposed on the upper frame.

Next, an assembly sequence for the MCU will be explained.

First, the rotor 21, the stator 22, and the motor windings 24 are mounted inside the bracket 72, and the lower frame 28 is press-fitted into and fixed to the bracket 72 to produce the electric motor 2.

Next, the electrically insulating connecting ring 25 is disposed on top of the motor windings 24, and delta-connection of the winding end portions of the motor windings 24 is performed by welding. Then, the bearing 29*a* is mounted to the upper frame 27, and then the upper frame 27 is disposed on an upper portion of the electric motor 2 such that the three extension windings 26 are passed through the upper frame 27 and extend outward.

The holder 9 in which the busbars 50 and 51 are embedded, on the other hand, is prepared by insert-molding or outserting. The capacitors 30 are mounted to this holder 9, and the capacitor terminals 47 and 48 are connected to the busbars 50 and 51 by soldering, for example. Other electronic equipment is also mounted to the holder 9, and is connected electrically.

Next, the PM 35*a* and the electric power supply relay 15 are disposed on the upper surface of the upper frame 27, and then the holder 9 is disposed from above the PM 35*a* and the electric power supply relay 15, and the respective terminals 41*a*, 43, 44*c*, and 42 that extend outward from the molded body 75 are passed through the respective apertures of the holder 9, and then the holder 9 is fixed to the upper frame 27 by fastening the bolts (not shown) through the round apertures 55 of the holder 9.

Next, the end portions of the extension windings 26 and the motor terminals 42 of the PM 35*a* are welded, and the electric power supply terminals 43 and 44*c* of the PM 35*a*, and the electric power supply terminal end portion 44*a* and 46*a* of the electric power supply relay 15, are also respectively connected by welding to the busbars 50 and 51.

Next, the controlling circuit board 3, on two sides of which a plurality of electronic components such as the CPU 10, the driving circuit 11, etc., are mounted, is stacked on the holder 9 so as to have the posts 54 interposed.

Thereafter, each of the signal terminals 41*a* and 41*b* and penetrating apertures (not shown) of the controlling circuit board 3 are soldered, and the case 19, on which the connectors 16 and 17 are formed integrally, is placed over so as to cover the controlling circuit board 3 and the holder 9.

Next, the respective terminals that extend from the controlling circuit board 3 and the holder 9 are extended outward to an upper portion of the case 19, each of these terminals is connected by welding to the busbars that extend from the connector terminals of each of the connectors 16 and 17 that are insert-molded or outserted during molding of the case 19, and the terminals of the coil 14 are also connected to the busbars by welding, and then finally the cover 18 is placed over the coil 14.

According to the electric power steering apparatus of the above embodiment, because the MCU is produced by sequentially stacking the electric motor 2, the upper frame 27, the holder 9, the controlling circuit board 3, and the case 19, workability is improved.

Because the PM 35a, in which the circuit configurations 35 for each of the phases are contained in the molded body 75, is disposed so as to be in close contact with the module recess portion 80, which is formed on the first surface on the first side of the holder 9, and the circumferential surfaces of the capacitors 30 are disposed so as to be in close contact with the capacitor recess portions 70 that are formed on the second surface on the second side, and the holder 9, which has a gap 52 that is less than or equal to the thickness of the PM 35a, is mounted to the upper frame 27, and a step is formed between the side near the PM 35a and the side near the capacitors 30 such that the side near the capacitors 30 is closer to the side near the upper frame 27 than the side near the PM 35a, axial dimensions can be reduced.

There is a gap 52 between the upper frame 27, which is a heatsink, and the holder 9, except at the contacting portion 81 for mounting thereof, making heat radiating characteristics of the capacitors 30 good.

Vibration resistance of the capacitors 30 is improved by increasing the depth of the capacitor recess portions 70.

Connection between the capacitor terminals 47 and 48 and the busbars 50 and 51 is facilitated by reducing the distances between the capacitor terminals 47 and 48 and the busbars 50 and 51.

Because the module recess portion 80, with which the PM 35a is placed in close contact, is formed on the holder 9, the PM 35a is reliably disposed at a predetermined position on the holder 9.

Because the connectors 16 and 17, which are electrically connected to the control unit 1 and extend parallel to the output shaft 23, are disposed on the upper surface of the cylindrical cup-shaped case 19, which is a flat surface, radial dimensions of the electric power steering apparatus will not be increased by the connectors 16 and 17.

Embodiment 2

Figure 4:
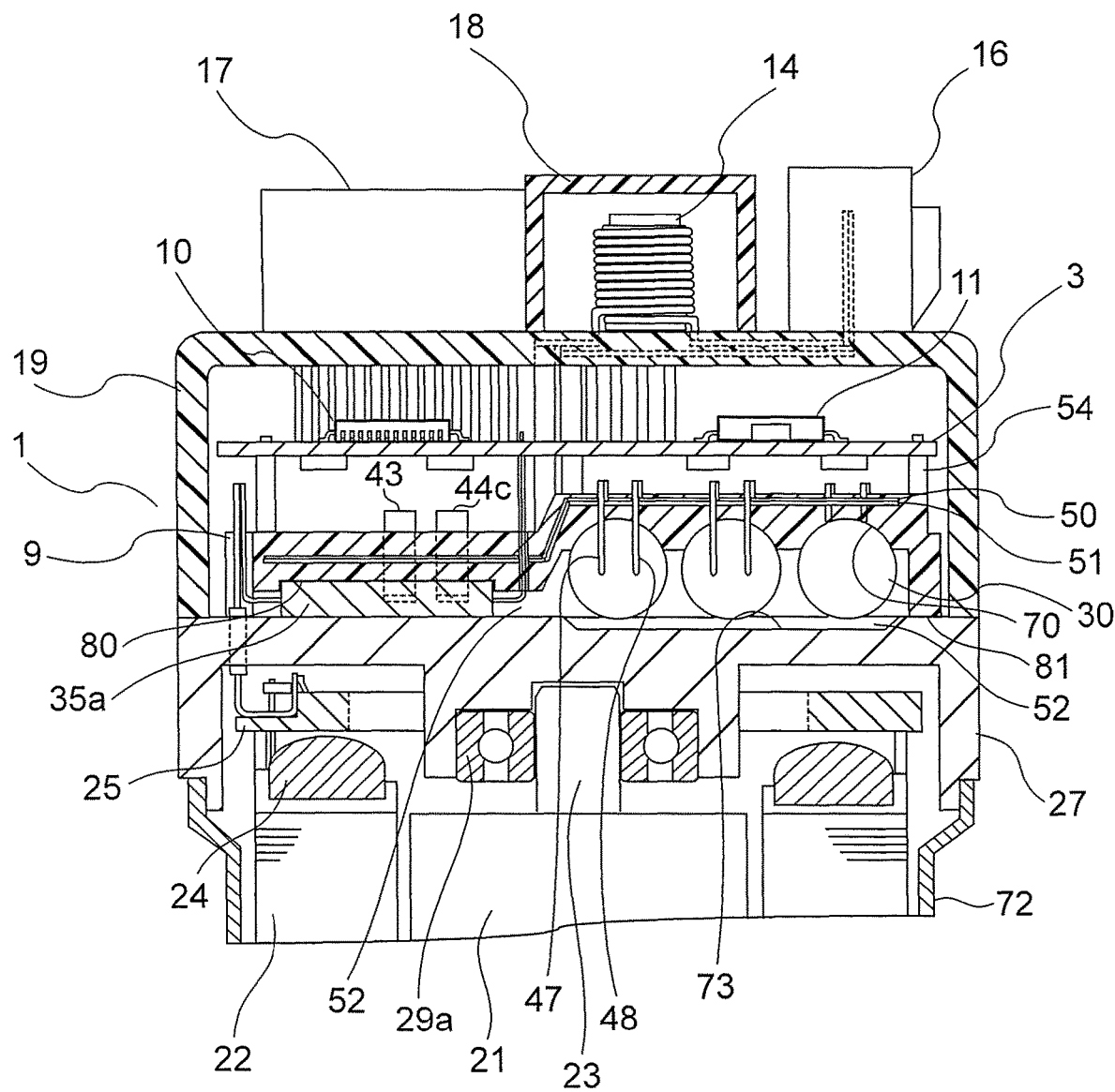
FIG. 4 is a cross section that shows part of an MCU of an electric power steering apparatus according to Embodiment 2 of the present invention.

FIG. 4 is a cross section that shows part of an MCU according to Embodiment 2 of the present invention.

In this embodiment, capacitors 30 are disposed on an identical surface of a holder 9 as that on which a PM 35a is disposed.

A step is larger than that in Embodiment 1 between the left side in the figure, on which the PM 35a is disposed, and the right side in the figure which the capacitors 30 are disposed.

Capacitor recess portions 70 that are parallel to external shapes of the capacitors 30 are formed on the surface of the holder 9 on which the capacitors 30 are disposed. In addition, a gap 52 is formed between the capacitors 30 and the upper frame (heatsink) 27. In order to reliably ensure this gap 52, depressed portions 73 are formed on portions of the upper frame 27 that face the capacitors 30.

The rest of the configuration is similar or identical to that of the MCU according to Embodiment 1.

According to the electric power steering apparatus of this embodiment, because the step is disposed in the busbars 50 and 51 such that the distance from the upper frame 27 on the side near the capacitors 30 is greater than that in Embodiment 1, it is possible to dispose the capacitors 30, which are large parts, on the side near the upper frame 27, i.e., on the identical side to the PM 35a.

A space is also formed between the opposite surface of the holder 9 from the PM 35a and the controlling circuit board 3, also enabling comparatively large parts to be additionally disposed in this space.

As a result thereof, because all of the electronic components that are mounted to the holder 9 are disposed on a side near the identical surface, terminals that constitute electrical connections of the respective electronic components project in identical directions, and mounting of the electronic components is in one direction, improving workability.

Embodiment 3

Figure 5:
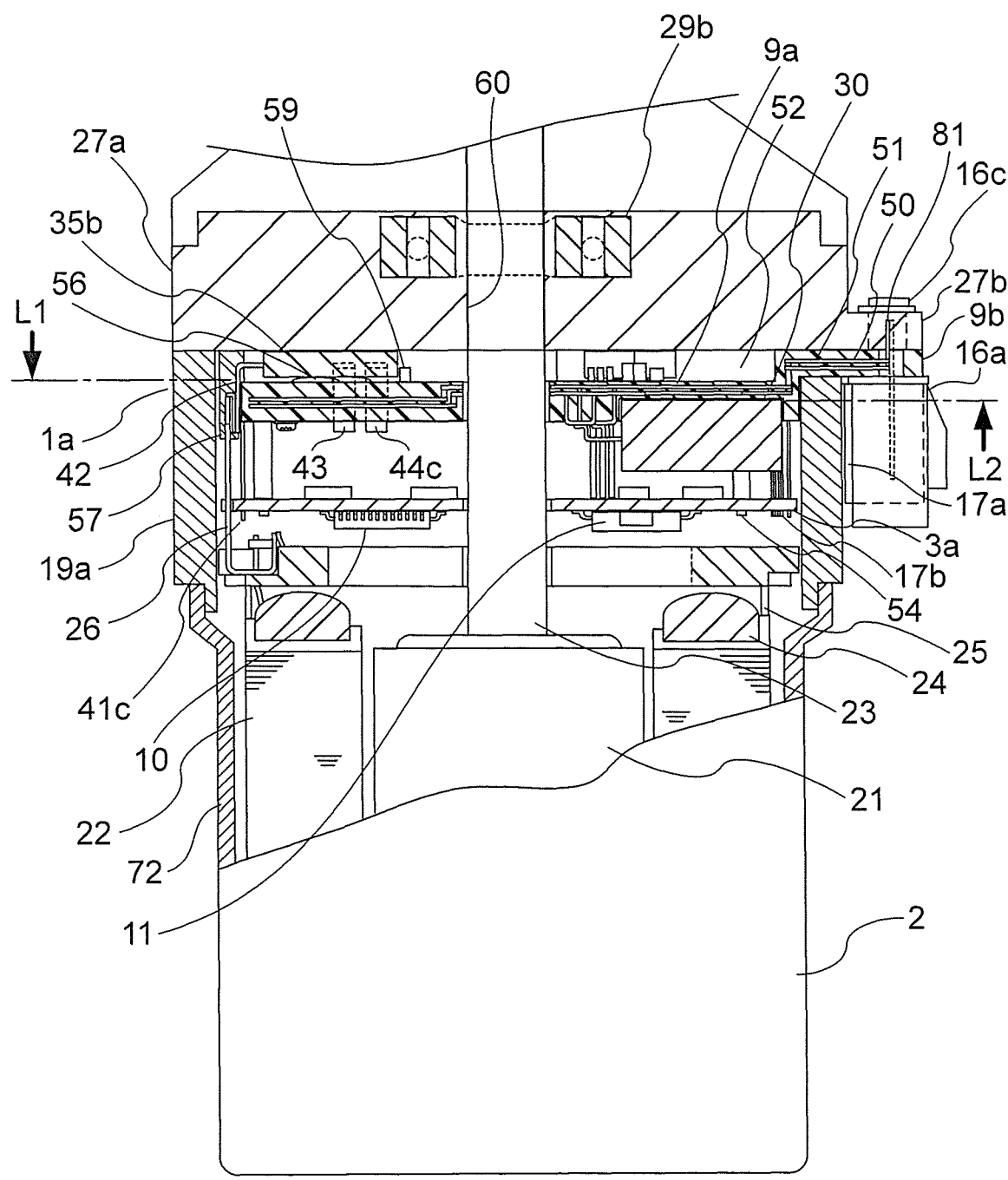
FIG. 5 is a partial cross section that shows an MCU of an electric power steering apparatus according to Embodiment 3 of the present invention.
Figure 6:
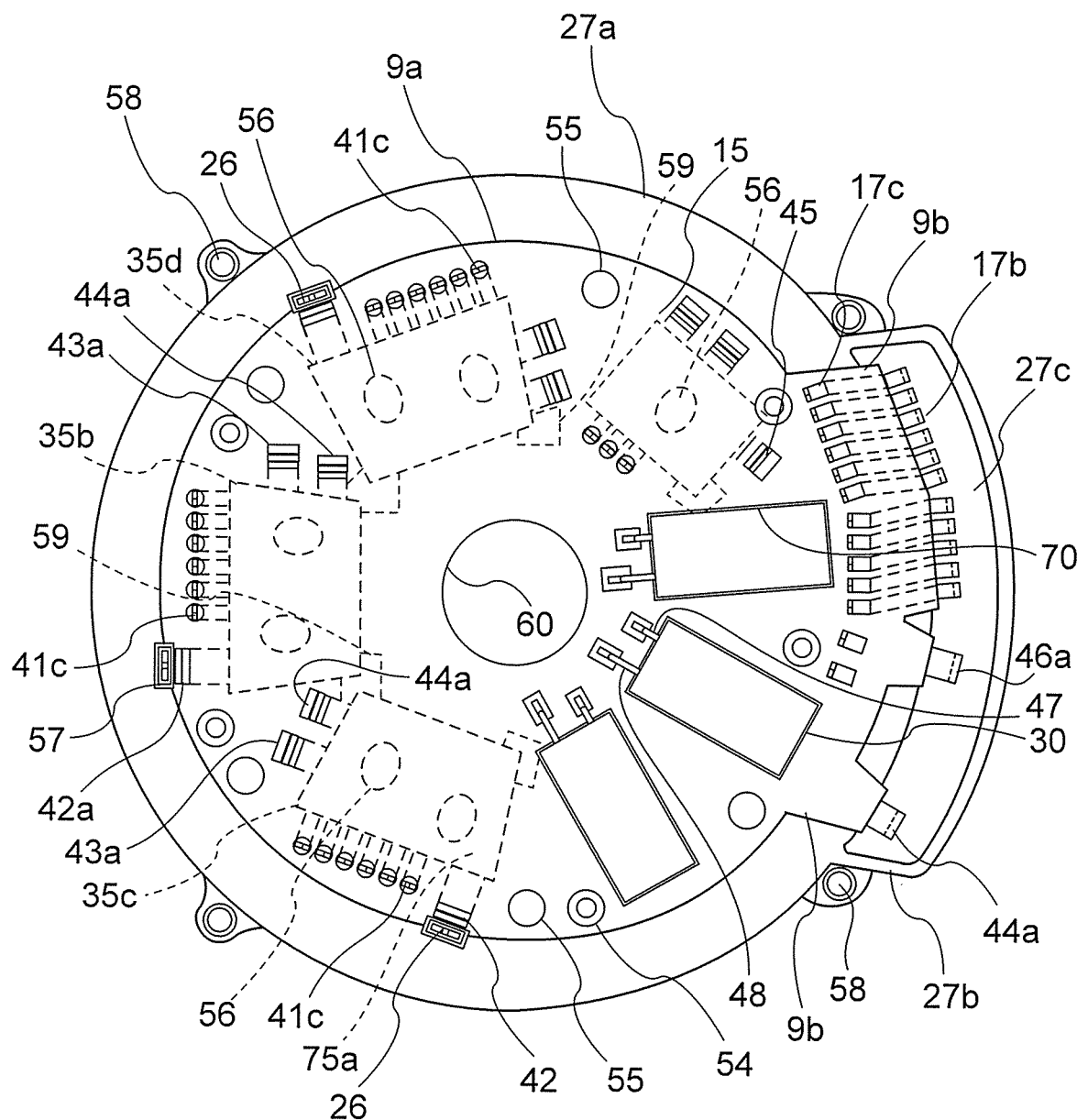
FIG. 6 is a bottom plan of the MCU from FIG. 5 after a controlling circuit board is removed.

FIG. 5 is a partial cross section that shows an MCU of an electric power steering apparatus according to Embodiment 3 of the present invention, and FIG. 6 is a bottom plan of the MCU from FIG. 5 after a controlling circuit board 3a is removed.

In this embodiment, a control unit 1a is disposed at an output shaft end (an upper portion in FIG. 5) of an electric motor 2.

In the PM 35a in Embodiments 1 and 2, all of the circuit configurations 35 from FIG. 1 were bundled together, but in PMs 35b, 35c, and 35d according to this embodiment, the respective circuit configurations 35 are integrated into molded bodies 75a, and each is separate.

The control unit 1a is disposed at the output end of an output shaft 23 of the electric motor 2, and above that an upper frame 27a into which an output end bearing 29b is fitted and a reduction gear (not shown) are disposed sequentially. Output shaft apertures 60, through each of which the output shaft 23 passes, are formed on central portions of the upper frame 27a, a controlling circuit board 3a, and a holder 9a.

At an end near the electric motor 2, a connecting ring 25 functions as a boundary wall between the electric motor 2 and the control unit 1a, and is expanded radially such that practically no gap arises between it and an inner circumferential wall surface of a case 19a. Tip end portions of extension windings 26 project beyond the controlling circuit board 3a to the holder 9a.

A CPU 10, a driving circuit 11, and other electronic components are mounted on two surfaces of the controlling circuit board 3, and a large number of terminals project upward from the controlling circuit board 3a toward the holder 9a and a connector 17a. The holder 9a is disposed above the controlling circuit board 3a, and capacitor terminals 47 and 48 of capacitors 30, which are large parts, are disposed in a space on the right side of FIG. 6 so as to point approximately toward center therein.

The PMs 35b, 35c, and 35d are disposed so as to be concentrated on the left side of FIG. 6.

Signal terminals 41c project downward from the PMs 35b, 35c, and 35d toward the controlling circuit board 3a.

In addition, the upper frame 27a, which also serves as a heatsink, is placed in contact with the upper surfaces of the PMs 35b, 35c, and 35d.

Next, the holder 9a and a vicinity thereof will be explained.

The molded bodies 75a of the PMs 35b, 35c, and 35d, which are all identically shaped, have an approximately trapezoidal shape as shown in FIG. 6, and motor terminals 42 for connection to the extension windings 26 are disposed on end portions of outer circumferential long sides. A plurality of signal terminals 41c also line up along that long side.

An electric power supply terminal end portion 43a (positive electric power supply) and an electric power supply terminal end portion 44a (ground), on the other hand, are disposed so as to line up on one of the oblique sides of the PMs 35b, 35c, and 35d. These PMs 35b, 35c, and 35d are disposed so as to be gathered together on the left in the figures, and the three extension windings 26 project so as to be separated from each other, in contrast to Embodiment 1.

Two protruding portions 56 are formed on each of the respective upper surfaces of the holder 9a to which the PMs 35b, 35c, and 35d are mounted, and the PMs 35b, 35c, and 35d are respectively pressed toward the upper frame 27a (the heatsink) and placed in close contact therewith along these protruding portions 56.

Wall portions 59 for positioning the PMs 35b, 35c, and 35d by coming into contact with two corner portions of the molded bodies 75a are disposed on the holder 9a.

Moreover, an electric power supply relay 15 is compact compared to the PMs 35b, 35c, and 35d, and is pressed using a single protruding portion 56.

Moreover, it is also possible to form recess portions on the holder 9a in a similar or identical manner to those of Embodiment 1, and to dispose the PMs 35b, 35c, and 35d in these recess portions so as to be placed in close contact therewith, but the PMs 35b, 35c, and 35d are disposed so as to be separated into each of the phases, requiring a plurality of recess portions to be formed, and disposing the respective wall portions 59 as positioning portions is more efficient.

Furthermore, these wall portions 59 are not limited to the corner portions of the molded bodies 75a of the PMs 35b, 35c, and 35d, and the PMs 35b, 35c, and 35d may be positioned by the wall portions 59 being placed in contact with side portions of the molded bodies 75a.

In order to enable the PMs 35b, 35c, and 35d to be reduced in size, the signal terminals 41c are disposed on an identical side portion of the molded bodies 75a as the motor terminals 42.

In addition, it is also possible to dispose the signal terminals 41c on the short side portions of the molded bodies 75a that are near the output shaft aperture 60, but because the terminals would be clustered around the output shaft aperture 60, it is better to dispose them on a radially outer side in consideration of area efficiency including that of the controlling circuit board 3a.

Next, as a method for connecting the extension windings 26 and the motor terminals 42, welding the two as in Embodiment 1 is difficult from a viewpoint of assemblability of each of the parts.

Because of that, the motor terminals 42 of the PMs 35b, 35c, and 35d are first connected to a first of separate busbars, and a second of those busbars is disposed inside a terminal holder 57 for positioning. The end portions of the extension windings 26 have a shape that is divided into a fork, for example, and have a connecting construction of a crimped type such that the end portion of the second busbar can be inserted into the fork thereof and connected.

By joining the electric motor 2 that has the extension windings 26 to the holder 9a in this manner, electrical connection can be completed simultaneously.

Because of that, the terminal holder 57 could be a separate part from the holder 9a, but it would be necessary to hold it on and fix it to the holder 9a.

A holder extension portion 9b that protrudes radially is disposed on an outer circumferential portion of the holder 9a on the right in FIG. 6. Connecting operations of the connectors 16a and 17a are performed using this holder extension portion 9b.

Because the control unit 1a is disposed at the output shaft end, a construction must be adopted in which the position of disposition of the connectors 16a and 17a projects out radially from the electric motor 2.

Because of that, and so as to allow for reductions in size, the connectors 16a and 17a are positioned as close as possible to an outer circumferential surface of the MCU, and the direction of insertion of each of the terminals of the connectors 16a and 17a is approximately parallel to the output shaft 23.

The state of busbars 50 and 51 of the electric power supply system is shown in FIG. 5, and electric power supply terminal end portions 44a (ground) and 46a (positive electric power supply) are shown in FIG. 6. The reason that the electric power supply terminal end portion 44a and the electric power supply terminal end portion 46a are separated in FIG. 6 is because the coil 14 from FIG. 1 is disposed there.

Terminals of the connectors 17a, which include terminals of sensors, and busbar end portions 17b in FIG. 6, on the other hand, are connected by welding, connector busbars are extended radially into the holder 9a from the holder extension portion 9b, and connector terminals 17c extend from there toward the controlling circuit board 3a. Because this holder extension portion 9b is disposed in addition to the holder 9a, the upper frame 27a also has a frame extension portion 27b.

In spaces in window portions 27c, the terminals of the connectors 17a and the busbar end portions 17b, and the electric power supply terminal end portions 44a and 46a, are respectively connected by welding. In addition, in order to cover these window portions 27c, seats of the connectors 16a and 17a are used on one, and the other is covered by a connector cover 16c that is shown in FIG. 5. Because an output shaft aperture 60 is also formed on a central portion of the holder 9a, and the area is smaller than in Embodiment 1, the electric power supply (positive) busbar 50 and the ground busbar 51, for example, are basically configured vertically in a 2-story construction.

As for wiring of the terminal portions of the capacitors 30, which are large parts, the busbars 50 and 51 rise up to a front surface of the holder 9a and are exposed, and the capacitor terminals 47 and 48 are soldered at these portions.

In addition, because the holder 9a has the holder extension portion 9b, and the upper frame 27a has the frame extension portion 27b, as described above, the shape of the case 19a, which envelops the control unit 1a, is also modified so as to conform to the two.

Unlike Embodiment 1 above, the case 19a is formed using a metal (made of aluminum, for example), so as to also take contact with the electric motor 2 into consideration, and has an approximately circular shape that has an opening portion in a portion of an outer circumference so as to conform with the holder extension portion 9b.

The case 19a and the upper frame 27a are fixed using bolts at a plurality of bolt apertures 58 that are formed on outer circumferential edge portions thereof.

The holder 9a and the upper frame 27a are fixed using bolts in round apertures 55 in a similar or identical manner to Embodiment 1. Because the PMs 35b, 35c, and 35d and the electric power supply relay 15 are pressed into close contact with the upper frame 27a by this fixing, it is desirable to form the round apertures 55 as close as possible to the PMs 35b, 35c, and 35d and the electric power supply relay 15.

Because the PMs 35b, 35c, and 35d are disposed close to each other, it is possible to apply a single fixture to two of the PMs 35b, 35c, and 35d by disposing the fixing positions (the round apertures 55) between the respective PMs 35b, 35c, and 35d, thereby contributing to reductions in size. A first end portion of the controlling circuit board 3a is also fixed by means of posts 54 that are connected to the holder 9a.

Next, an assembly sequence for the MCU that has the above construction will be explained.

The electric motor 2 is similar to that of Embodiment 1, the connecting ring 25 is disposed on the motor windings 24 so as to cover them, connection is made therein, and three winding end portions project separately and independently as the extension windings 26.

Next, the capacitors 30 are mounted to and fixed to the holder 9a, which has the holder extension portion 9b that has the busbars 50 and 51 inside, and the capacitor terminals 47 and 48 thereof are connected to the busbars 50 and 51 by soldering, for example. In addition, the PMs 35b, 35c, and 35d and the electric power supply relay 15 are mounted to an opposite surface from the capacitors 30 at predetermined positions, and the electric power supply terminal end portions 43a and 44a are respectively connected to the end portions of the busbars 50 and 51 by welding.

In addition, the controlling circuit board 3a to which the CPU 10, the driving circuit 11, and other electronic components are mounted, is mounted to the holder 9a, and the large number of signal terminals 41c and lands that have apertures on the controlling circuit board 3a are soldered. An assemblage in which the controlling circuit board 3a, the holder 9a, and the PMs 35b, 35c, and 35d of the control unit 1a are united is completed in this state.

Next, the case 19a is mounted onto the above-mentioned electric motor 2, and then the above assemblage is integrated such that the output shaft 23 passes through the output shaft aperture 60. At this point, it is necessary to press down such that the terminals inside the terminal holder 57 for positioning the holder 9a and the extension windings 26 are crimped together.

Next, the connectors 16a and 17a are mounted, and the terminals thereof and the terminals of the busbars are also welded using the space of the window portions 27c.

Next, the upper frame 27a including the output end bearing 29b is mounted and fixed to the case 19a, and the PMs 35b, 35c, and 35d and the electric power supply relay 15 are placed in close contact with the flat surfaces of the upper frame 27a.

Finally, the connector cover 16c is mounted.

In the above manner, a construction in which the control unit 1a is mounted in the direction of the output shaft can still be stacked sequentially and assembled even if the PMs 35b, 35c, and 35d are separated into each of the phases independently, and assembly can also be simplified.

Axial length can be shortened by having contacting surfaces of the PMs 35b, 35c, and 35d and mounting surfaces of the capacitors 30, which are large parts, in an approximately straight line, or so as to have a slight step in the holder 9a, enabling reductions in size.

Because the connectors 16a and 17a are disposed along the outer circumferential surface of the case 19a, expansion of radial dimensions of the electric power steering apparatus due to the connectors 16a and 17a can be suppressed.

EXPLANATION OF NUMBERING 1, 1a CONTROL UNIT; 2 ELECTRIC MOTOR; 3, 3a CONTROLLING CIRCUIT BOARD; 4 INVERTER CIRCUIT; 5 ROTATION SENSOR; 6 BATTERY; 7 IGNITION SWITCH; 8 SENSORS; 9, 9a HOLDER; 9b HOLDER EXTENSION PORTION; 10 CPU; 11 DRIVING CIRCUIT; 12 ELECTRIC CURRENT DETECTING CIRCUIT; 13 ROTATIONAL ANGLE DETECTING CIRCUIT; 14 COIL; 15 ELECTRIC POWER SUPPLY RELAY; 16, 16a, 17, 17a CONNECTOR; 16c CONNECTOR COVER; 17b BUSBAR END PORTION; 17c CONNECTOR TERMINAL; 18 COVER; 19, 19a CASE; 21 ROTOR; 22 STATOR; 23 OUTPUT SHAFT; 24 MOTOR WINDING; 25 CONNECTING RING; 26 EXTENSION WINDING; 27, 27a UPPER FRAME; 27b FRAME EXTENSION PORTION; 27c WINDOW PORTION; 28 LOWER FRAME; 29a NON-OUTPUT END BEARING; 29b OUTPUT END BEARING; 30 CAPACITOR; 31, 32, 33 SWITCHING ELEMENT; 34 SHUNT RESISTOR; 35 CIRCUIT CONFIGURATION; 35a, 35b, 35c, 35d PM; 417, 41b, 41c SIGNAL TERMINAL; 42 MOTOR TERMINAL; 43, 44c, 45, 46 ELECTRIC POWER SUPPLY TERMINALS; 43a, 44a, 46a ELECTRIC POWER SUPPLY TERMINAL END PORTIONS; 47, 48 CAPACITOR TERMINAL; 49 WINDOW PORTION; 50, 51 BUSBAR; 52 GAP; 53 ELECTRICALLY INSULATING TUBE; 54 POST; 55 ROUND APERTURE; 57 TERMINAL HOLDER; 58 BOLT APERTURE; 59 WALL PORTION; 60 OUTPUT SHAFT APERTURE; 70 CAPACITOR RECESS PORTION; 71 NOTCH PORTION; 72 BRACKET; 73 DEPRESSED PORTION; 75, 75a MOLDED BODY; 76 EXPANDED PORTION; 80 MODULE RECESS PORTION; 81 CONTACTING PORTION.

The invention claimed is:

1. An electric power steering apparatus in which a control unit that controls driving of an electric motor is disposed so as to be coaxial to an output shaft of said electric motor, and in which said control unit and said electric motor are integrated, wherein:

said control unit comprises:
   a power module that is in surface contact with a heatsink, and in which a plurality of switching elements are mounted internally, said power module controlling electric power that is supplied to said electric motor;
   a holder that places said power module in surface contact with said heatsink, and that also positions said power module; and
   a controlling circuit board that is disposed so as to be separated axially from said holder, and on which a central processing unit (CPU) that controls driving of said electric motor is mounted; and said power module is disposed on a first surface of said holder, and a circumferential surface of a capacitor that suppresses electric power supply pulsation is disposed so as to be in surface contact with a capacitor recess portion that is formed on a second surface of said holder.

2. The electric power steering apparatus according to claim 1, wherein an electric power supply system busbar that is embedded in said holder comprises a step in which a portion that is near said capacitor is closer to said heatsink than a portion that is near said power module.

3. The electric power steering apparatus according to claim 2, wherein said busbar is electrically connected to each of an electric power supply terminal of said power module and a capacitor terminal of said capacitor.

4. The electric power steering apparatus according to claim 3, wherein said busbar is electrically connected to said electric power supply terminal in a space between said holder and said controlling circuit board, and said busbar is electrically connected to said capacitor terminal inside or at a front surface of said holder.

5. The electric power steering apparatus according to claim 1, wherein a module recess portion with which said power module is placed in surface contact is formed on said holder.

6. The electric power steering apparatus according to claim 1, wherein a protruding portion that is placed in contact with said power module is formed on said holder.

7. The electric power steering apparatus according to claim 1, wherein a wall portion that is placed in contact with an edge portion of a molded body in which said plurality of switching elements are mounted internally, and that positions said power module, is formed on said holder.

8. The electric power steering apparatus according to claim 1, wherein a post that spaces apart and holds said holder and said controlling circuit board is disposed between said holder and said controlling circuit board.

9. The electric power steering apparatus according to claim 1, wherein a contacting portion that protrudes toward said heatsink and is placed in contact with said heatsink is formed on a circumferential edge portion of said holder, and a gap is formed between said holder and said heatsink.

10. The electric power steering apparatus according to claim 1, wherein:
a non-output end bearing that rotatably supports said output shaft is disposed on a central portion of said heatsink;
said power module, said holder, and said controlling circuit board that are stacked sequentially from said heatsink are sealed by a case that has a plane of a cylindrical cup shape that has an end surface that is placed in contact with an outer circumferential edge portion of said heatsink; and
a connector that is electrically connected to said control unit, and that extends so as to be parallel to said output shaft, is disposed within said plane of said case.

11. The electric power steering apparatus according to claim 1, wherein:
an output end bearing is disposed on a central portion of said heatsink so as to rotatably support said output shaft, which passes through said heatsink;
said power module, said holder, and said controlling circuit board that are stacked sequentially from said heatsink are sealed by a tubular case that has a first end surface that is placed in contact with an outer circumferential edge portion of said heatsink, and a second end surface that is placed in contact with an end surface of a bracket of said electric motor; and
a connector that that is disposed alongside an outer circumferential surface of said case is electrically connected to said control unit radially outside said case.

12. The electric power steering apparatus according to claim 1, wherein said switching elements of respective phases of said power module are embedded in a single molded body.

13. The electric power steering apparatus according to claim 1, wherein said switching elements of respective phases of said power module are embedded in separate molded bodies, and said power modules for each of said phases are disposed in a radial pattern so as to point toward said output shaft.

14. An electric power steering apparatus in which a control unit that controls driving of an electric motor is disposed so as to be coaxial to an output shaft of said electric motor, and in which said control unit and said electric motor are integrated, wherein:
said control unit comprises:
a power module that is in surface contact with a heatsink, and in which a plurality of switching elements are mounted internally, said power module controlling electric power that is supplied to said electric motor;
a holder that places said power module in surface contact with said heatsink, and that also positions said power module; and
a controlling circuit board that is disposed so as to be separated axially from said holder, and on which a central processing unit (CPU) that controls driving of said electric motor is mounted; and
said power module is disposed on a first surface of said holder, and a circumferential surface of a capacitor that suppresses electric power supply pulsation is disposed so as to be in surface contact with a capacitor recess portion that is formed on said first surface of said holder, wherein said first surface includes different relative elevations in relation to the controlling circuit board.

15. The electric power steering apparatus according to claim 14, wherein an electric power supply system busbar that is embedded in said holder comprises a step in which a portion that is near said capacitor is closer to said controlling circuit board than a portion that is near said power module.

16. The electric power steering apparatus according to claim 15, wherein said busbar is electrically connected to each of an electric power supply terminal of said power module and a capacitor terminal of said capacitor.

17. The electric power steering apparatus according to claim 16, wherein said busbar is electrically connected to said electric power supply terminal in a space between said holder and said controlling circuit board, and said busbar is electrically connected to said capacitor terminal inside or at a front surface of said holder.

18. The electric power steering apparatus according to claim 14, wherein a module recess portion with which said power module is placed in surface contact is formed on said holder.

19. The electric power steering apparatus according to claim 14, wherein a protruding portion that is placed in contact with said power module is formed on said holder.

20. The electric power steering apparatus according to claim 14, wherein a wall portion that is placed in contact with an edge portion of a molded body in which said plurality of switching elements are mounted internally, and that positions said power module, is formed on said holder.

21. The electric power steering apparatus according to claim 14, wherein a post that spaces apart and holds said holder and said controlling circuit board is disposed between said holder and said controlling circuit board.

22. The electric power steering apparatus according to claim 14, wherein a contacting portion that protrudes toward said heatsink and is placed in contact with said heatsink is formed on a circumferential edge portion of said holder, and a gap is formed between said holder and said heatsink.

23. The electric power steering apparatus according to claim 14, wherein:

a non-output end bearing that rotatably supports said output shaft is disposed on a central portion of said heatsink;

said power module, said holder, and said controlling circuit board that are stacked sequentially from said heatsink are sealed by a case that has a plane of a cylindrical cup shape that has an end surface that is placed in contact with an outer circumferential edge portion of said heatsink; and a connector that is electrically connected to said control unit, and that extends so as to be parallel to said output shaft, is disposed within said plane of said case.

24. The electric power steering apparatus according to claim 14, wherein:

an output end bearing is disposed on a central portion of said heatsink so as to rotatably support said output shaft, which passes through said heatsink;

said power module, said holder, and said controlling circuit board that are stacked sequentially from said heatsink are sealed by a tubular case that has a first end surface that is placed in contact with an outer circumferential edge portion of said heatsink, and a second end surface that is placed in contact with an end surface of a bracket of said electric motor; and a connector that that is disposed alongside an outer circumferential surface of said case is electrically connected to said control unit radially outside said case.

25. The electric power steering apparatus according to claim 14, wherein said switching elements of respective phases of said power module are embedded in a single molded body.

26. The electric power steering apparatus according to claim 14, wherein said switching elements of respective phases of said power module are embedded in separate molded bodies, and said power modules for each of said phases are disposed in a radial pattern so as to point toward said output shaft.

* * * * *